(12) United States Patent
Moon (10) Patent No.: US 10,054,611 B2
(45) Date of Patent: Aug. 21, 2018

(54) METHOD OF CONTROLLING FREQUENCY MODULATED-ATOMIC FORCE MICROSCOPE

(71) Applicant: Keysight Technologies, Inc., Minneapolis, MN (US)

(72) Inventor: Christopher Ryan Moon, Cupertino, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 755 days.

(21) Appl. No.: 13/685,842

(22) Filed: Nov. 27, 2012

(65) Prior Publication Data

US 2014/0150139 A1 May 29, 2014

(51) Int. Cl.
*G01Q 10/06* (2010.01)
*G01Q 60/32* (2010.01)

(52) U.S. Cl.
CPC .......... *G01Q 10/065* (2013.01); *G01Q 60/32* (2013.01)

(58) Field of Classification Search
CPC .............................. G01Q 10/06; G01Q 10/065
See application file for complete search history.

(56) References Cited

U.S. PATENT DOCUMENTS 5,966,053 A * 10/1999 Durig et al. ............. 331/116 M
5,986,381 A 11/1999 Hoen et al.
6,008,489 A * 12/1999 Elings et al. ................. 250/234
6,686,803 B1 * 2/2004 Perrott ..................... H03L 7/087
  331/10
8,291,510 B2 10/2012 Schroeder et al.
2004/0020279 A1 * 2/2004 Degertekin ............ B82Y 35/00
  73/105

(Continued)

FOREIGN PATENT DOCUMENTS

EP         2392930 A1    12/2011
WO     2012115653 A1     8/2012

OTHER PUBLICATIONS

Laakso et al., "Splitting the Unit Delay: Tools for Fractional Delay Filter Design", IEEE Signal Processing Magazine, Jan. 1996.*

(Continued)

*Primary Examiner* — Wyatt Stoffa
*Assistant Examiner* — James Choi (57) ABSTRACT

A method is provided for controlling an FM-AFM including a cantilever having a resonant frequency and an excitation system configured to oscillate the cantilever in response to a drive signal. The method includes determining latency of the excitation system; receiving a deflection signal indicating a deflection of a cantilever tip; mixing the deflection signal with a first sine signal output by a PLL indicating a frequency shift of a frequency response of the cantilever; measuring the frequency shift in response to the drive signal; determining spurious phase of the cantilever based on the determined latency, the resonant frequency of the cantilever, and the measured frequency shift; providing a second sine signal having a phase that is advanced by the determined spurious phase to preemptively compensate for subsequent spurious phase of the cantilever; and driving the excitation system using the second sine signal with an adjusted amplitude as the drive signal.

17 Claims, 11 Drawing Sheets

(56) References Cited

U.S. PATENT DOCUMENTS

| | | | |
|---|---|---|---|
| 2007/0223639 A1* | 9/2007 | Unterricker | H03L 7/081 375/376 |
| 2008/0140343 A1 | 6/2008 | Rover et al. | |
| 2011/0004967 A1* | 1/2011 | Jesse et al. | 850/21 |
| 2012/0030845 A1* | 2/2012 | Fukuma | B82Y 35/00 850/1 |
| 2012/0079634 A1 | 3/2012 | Tella et al. | |
| 2013/0117895 A1* | 5/2013 | Proksch et al. | 850/1 |

OTHER PUBLICATIONS

Bueno et al., "Simulations of the Frequency Modulated Atomic Force Microscope (FM-AFM) Nonlinear Control System", Chaotic Modeling and Simulation (CMSIM), 2011.*

Bueno et al., "Design constraints for third-order PLL nodes in master-slave clock distribution networks", Commun Nonlinear Sci Numer Simulat 15, 2010.*

Aleksander Labuda et al., "Decoupling conservative and dissipative forces in frequency modulation atomic force microscopy", American Physical Society, Physical Review B 84, 125433 (2011), pp. 125433-1-125433-11.

A. Labuda et al., "Comparison of photothermal and piezoacoustic excitation methods for frequency and phase modulation atomic force microscopy in liquid environments," AIP Advances 1, 022136 (2011), pp. 022136-1-022136-17.

Takeshi Fukuma et al, "Wideband phase-locked loop circuit with real-time phase correction for frequency modulation atomic force microscopy", AIP Rev. Sci. Instrum. 82, 073707 (2011), pp. 073707-1-073707-5.

Roger Proksch et al., "Energy dissipation measurements in frequency-modulated scanning probe microscopy", IOP Publishing Nanotechnology 21 (2010) 455705, pp. 1-6.

Toshio Ando, "High-speed atomic force microscopy for nanovisualization of dynamic biomolecular processes," ScienceDirect, Progress in Surface Science 83 (2008) pp. 337-437.

* cited by examiner

METHOD OF CONTROLLING FREQUENCY MODULATED-ATOMIC FORCE MICROSCOPE

BACKGROUND

An atomic force microscope (AFM) is a comparatively high-resolution type of scanning probe microscope. With demonstrated resolution of fractions of a nanometer, AFMs promise resolution more than 1000 times greater than the optical diffraction limit.

Generally, conventional AFMs include a microscale cantilever with a sharp tip (probe) at its end that is used to scan the specimen surface. The cantilever is typically silicon or silicon nitride with a tip radius of curvature on the order of nanometers. When the tip is brought into contact with a sample surface, forces between the tip and the sample lead to a deflection of the cantilever. One or more of a variety of forces are measured via the deflection of the cantilevered probe tip. These include mechanical forces and electrostatic and magnetostatic forces, to name only a few. Typically, the deflection of the cantilevered probe tip is measured using a laser spot reflected from the top of the cantilever and onto an optical detector. Other methods that are used include optical interferometry and piezoresistive AFM cantilever sensing.

A relatively recent type of AFM is a frequency-modulation (FM) AFM (FM-AFM). In addition to inherent speed and extremely high spatial resolution, the FM-AFM may be able to isolate and quantitatively measure both conservative and dissipative tip-sample interactions. However, such measurements are generally tainted by instrumental artifacts, making them irreproducible and controversial. The dissipation signal is corrupted to the extent that researchers call it "apparent dissipation" to encompass its huge variation, unphysical negative values, and contrast inversion.

Recently, these instrumental artifacts have been traced to time delays and "spurious" dynamics of a cantilever excitation system used for oscillating the cantilever. More particularly, the cantilever excitation system of the FM-AFM attempts to oscillate the cantilever on resonance (i.e., at the resonant frequency of the cantilever) by varying the frequency of the sine drive signal to nominally keep cantilever phase at about −90 degrees. For example, at the start of an experiment, the resonant frequency of the cantilever is chosen according to various known techniques, and any spurious difference from −90 degrees is compensated for using an offset in phase. However, the offset becomes inaccurate when the cantilever interacts with the surface of a sample, and the resonant frequency of the cantilever shifts.

Therefore, in order to keep the measured phase constant, a conventional FM-AFM settles on a frequency of the drive signal that is off-resonance by an amount equaling the frequency-dependent change in the spurious phase. Driving the cantilever off-resonance, in turn, causes the amplitude of the cantilever oscillation to decrease. This is compounded by the frequency dependence of the cantilever excitation system, leading to large false variations in the apparent dissipation. These problems are particularly severe for acoustic excitation (described as a "forest of peaks"), but are also significant for direct cantilever excitation methods, such as photothermal and magnetic excitation. In addition, these dynamics cause the maximum frequency response of the cantilever to occur separately from the actual resonant frequency, which may confuse the user. In practice, the cantilever is never actually driven on-resonance, thus violating the fundamental assumptions of quantitative FM-AFM.

In attempts to correct these errors, elaborate measures have been developed to strip away artifacts from measured FM-AFM data using post-processing, which is computationally intense. In addition, the FM-AFM still operates off-resonance, and correct physical signals are not available in real time, either to the user for analysis or to the remainder of the FM-AFM for feedback. Accordingly, there is a need for a system and method that eliminate the artifacts in real time, such that the frequency shift and dissipation signals reflect only actual cantilever physics.

SUMMARY

In a representative embodiment, a method is provided for controlling a frequency modulation (FM) atomic force microscope (AFM), which includes a cantilever having a resonant frequency and an excitation system configured to oscillate the cantilever in response to a drive signal. The method comprises determining latency of the excitation system; receiving a deflection signal indicating a deflection of a tip of the cantilever; mixing the deflection signal with a first sine signal output by a phase lock loop (PLL) indicating a frequency shift of a frequency response of the cantilever; measuring the frequency shift of the frequency response of the cantilever in response to the drive signal; determining spurious phase of the cantilever based on the determined latency, the resonant frequency of the cantilever, and the measured frequency shift of the frequency response of the cantilever in response to the drive signal; providing a second sine signal having a phase that is advanced by the determined spurious phase to preemptively compensate for subsequent spurious phase of the cantilever; and driving the excitation system using the second sine signal with an adjusted amplitude as the drive signal.

In another representative embodiment, a method is provided for controlling an FM-AFM, which includes a cantilever having a resonant frequency and an excitation system configured to oscillate the cantilever in response to a drive signal. The method comprises determining latency of the excitation system; receiving a deflection signal at a PLL indicating a deflection of a tip of the cantilever; measuring a frequency shift of a frequency response of the cantilever in response to the drive signal; providing a first sine signal based on the frequency response and the resonant frequency of the cantilever; providing a second sine signal by delaying the first sine signal by a delay time that matches the determined latency of the excitation system; mixing the deflection signal with the second sine signal to input to the PLL; and providing the drive signal for driving the excitation system based on the first sine signal.

In another representative embodiment, a method is provided for controlling a system including an excitation system to respond to a drive signal via a PLL, the excitation system introducing latency and spurious dynamics into a system response. The method comprises isolating a frequency response and a spurious response of the system response when being driven the drive signal, the spurious response reflecting the latency and spurious dynamics introduced by the excitation system; and performing a feed forward operation to compensate for the isolated spurious response.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

It is to be understood that certain terminology defined herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices. Also, in addition to their ordinary meanings, the terms "substantial" or "substantially" mean to be within acceptable limits or degree, and the term "approximately" means to within an acceptable limit or amount to one having ordinary skill in the art.

Figure 1:
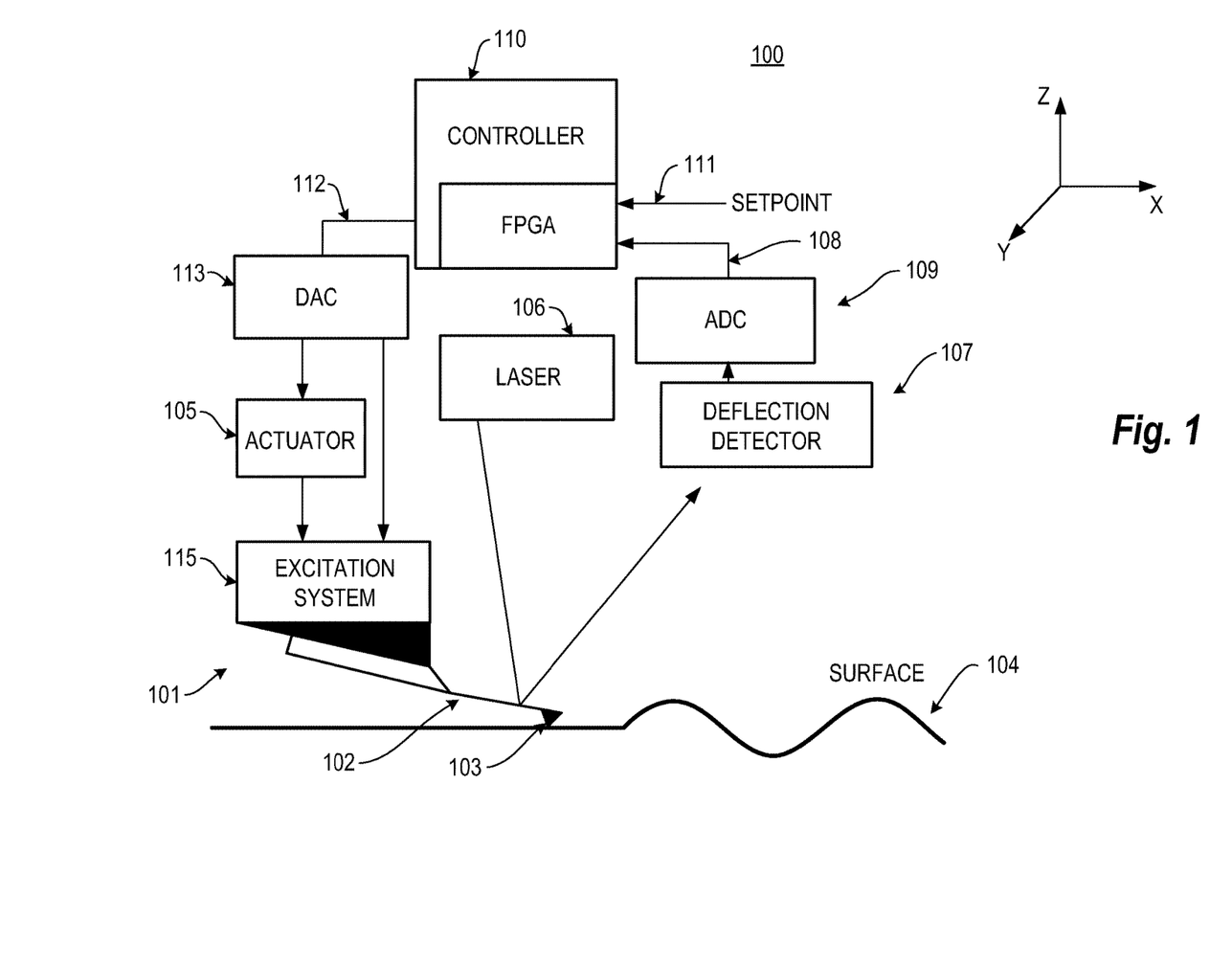
FIG. 1 is a simplified schematic block diagram of an AFM apparatus in accordance with a representative embodiment.

FIG. 1 is a simplified schematic block diagram of an FM-AFM system 100 in accordance with a representative embodiment. As will be readily appreciated by one of ordinary skill in the art, the present teachings are applicable to various types of AFMs, which may also be referred to as scanning force microscopes (SFMs). Likewise, the present teachings are applicable to any system having a phase locked loop (PLL) that requires measurement of a frequency shift, where the system also contains spurious dynamics, as well as any system using a PLL and an automatic gain controller (AGC) to measure changes in frequency response and/or amplitude response of the system. The FM-AFM system 100 comprises many electrical and mechanical components, the discussion of which is outside the scope of the present teachings.

Referring to FIG. 1, the FM-AFM system 100 comprises a probe assembly 101, which includes a cantilever 102 with a probe tip 103 connected thereto. The probe tip 103 contacts a surface 104 of a sample, an actuator 105 is configured to raise and lower the probe tip 103 in response to contact movement with the surface 104, and an excitation system 115 is configured to oscillate the cantilever 102 at or near its resonance. The actuator 105 may be a piezoelectric actuator, for example, formed of a piezoelectric material to acoustically stimulate the cantilever 102. The excitation system 115 likewise may include a piezoelectric actuator, for example, formed of a piezoelectric material for oscillating the cantilever 102. In the depicted example, the actuator 105 and the excitation system 115 are stacked physically and the excitation piezoelectric actuator may be moved by the piezoelectric actuator 105, although they are electrically separate. The sample may be moved generally in the X-Y plane of the coordinate system of FIG. 1 to raster-scan the surface 104 of the sample by the actuator 105, with the surface topography being mapped by motion of the probe assembly 101 in the Z-direction.

The probe tip 103 and the cantilever 102 may be monolithically formed from a common substrate using known semiconductor processing techniques, fastened to the actuator 105 and oscillated by the excitation system 115. Alternatively, the actuator 105, the cantilever 102, the probe tip 103 and/or the excitation system 115 may be monolithically formed from a common substrate. In representative embodiments, the probe tip 103 is configured to contact the surface 104 in order to make measurements of the surface topography.

The actuator 105 functions to provide motion of the probe tip 103 and the cantilever 102 in the +Z-direction in order to maintain a substantially constant force between the probe tip 103 and surface 104 of the sample. As mentioned above, the actuator 105 may be a piezoelectric actuator, such as described in commonly owned U.S. patent application Ser. No. 12/890,894, filed on Sep. 27, 2010, and published as U.S. Patent App. Pub. No. 2012/0079634, on Mar. 29, 2012, entitled "Tandem Piezoelectric Actuator and Single Drive Circuit for Atomic Force Microscopy," to D. Schroeder, et al., which is hereby incorporated by reference. Alternatively, the actuator 105 may be an electrostatic "nanostepper" actuator, for example, such as described in commonly owned U.S. Pat. No. 5,986,381 to S. Hoen et al., dated Nov. 16, 1999, entitled "Electrostatic Actuator with Spatially Alternating Voltage Patterns," which is hereby incorporated by reference.

The FM-AFM system 100 further comprises a laser 106 (or other suitable light source) disposed above the surface 104 of the sample. The laser 106 directs light which is reflected at the cantilever 102 and is incident on a deflection detector 107. The deflection detector 107 provides a deflection signal 108 to an analog-to-digital converter (ADC) 109, which provides a digitized signal to a controller 110. The deflection signal 108 is indicative of the movement of the probe tip 103 in the Z-direction. In response to the deflection signal 108, the controller 110 provides an output signal 112 to the actuator 105 via digital-to-analog converter (DAC) 113 to raise and lower the cantilever 102 and probe tip 103 to maintain a constant deflection equal to a setpoint deflection 111, leading to a constant force between the probe tip 103 and the surface 104 in contact-mode. A second DAC (not shown) or a second output of the DAC 113 provides a separate excitation signal from the controller 110 to the excitation system 115, discussed below. Among other functions, the controller 110 may be configured to account for resonance conditions that can occur when the cantilever 102 is deflected off the surface 104 ("off-surface resonance conditions"), as described in commonly owned International Application PCT/US11/26191, filed on Feb. 25, 2011, entitled "Atomic Force Microscopy Controller and Method" to C. Moon, which is hereby incorporated by reference. In addition, the controller 110 may be configured to compensate for spurious response and corresponding phase shift, as discussed further, below.

Figure 2:
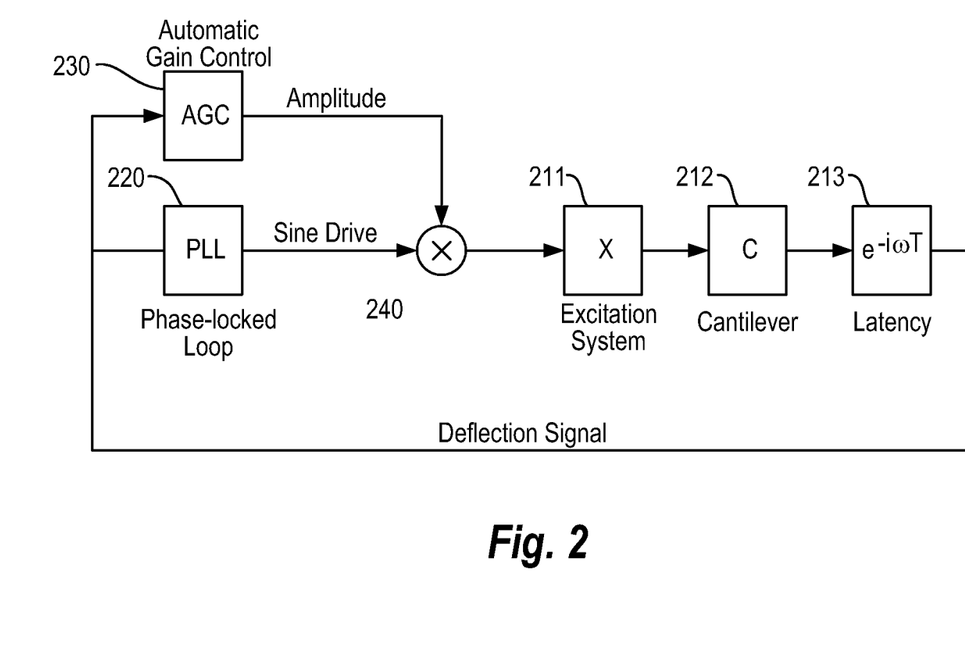
FIG. 2 is a simplified block diagram of control loop functionality of the controller in an FM-AFM system, in accordance with a representative embodiment.

FIG. 2 is a simplified block diagram of control loop (or feedback loop) functionality of the controller in an FM-AFM system, in accordance with a representative embodiment.

Referring to FIG. 2, the control loop includes spurious frequency response (X) 211 of the excitation system 115 (which may be referred to as "spurious response"), frequency response (C) 212 of the cantilever 102 (which may be referred to as "cantilever response"), and latency frequency response ($e^{-i\omega T}$) 213 of the excitation system 115 (which may be referred to as "latency response"). The spurious response 211 represents the spurious signals introduced by the excitation system 115 of the FM-AFM system, which may include a piezoelectric actuator driven in response to an excitation signal from the DAC 113, for example, discussed above with reference to FIG. 1. The control loop further includes phase locked loop (PLL) 220 and automatic gain control (AGC) 230. A sine drive signal output by the PLL 220 is mixed by multiplier 240 with a gain control signal output by the AGC 230 to provide an amplitude adjusted (or scaled) sine drive signal (which may be referred to as "excitation signal"). The spurious response 211 results from the excitation signal provided to the excitation system 115, which operates to oscillate the cantilever 102 at or near its resonance. The latency response 213 represents the delay introduced by operation of the excitation system 115, the delay being indicated as $e^{-i\omega T}$, where $\omega$ is the frequency of the cantilever response 212 and T is the previously determined latency of the excitation system 115. In response to movement of the cantilever 102, a deflection signal is output (e.g., by the deflection detector 107) following the latency response 213. The deflection signal is applied to the PLL 220 and the AGC 230, which provide the next amplitude adjusted, sine drive signal to the excitation system 115.

As an initial matter, the FM-AFM system is characterized in order to isolate the cantilever response 212 of the cantilever 102 and the spurious response 211 of the excitation system 115. The cantilever response 212 may be extracted from thermal noise density of the cantilever 102, for example, referred to as a thermal tune. The thermal tune may include fitting deflection noise density to a mathematical model of the cantilever. Alternatively, an excitation system 115 with a negligible or known spurious response may be used.

For purpose of illustration, a high-frequency (~1.5-MHz) cantilever 102 operating in air was positioned above a conducting sample and excited electrostatically by the excitation system 115 via an AC+DC tip-sample bias. The cantilever response 212 was measured and fit with a mathematical model of the cantilever with additional time delay, revealing a latency of 2.6 μs (T=2.6 μs), for example.

Figure 3A:
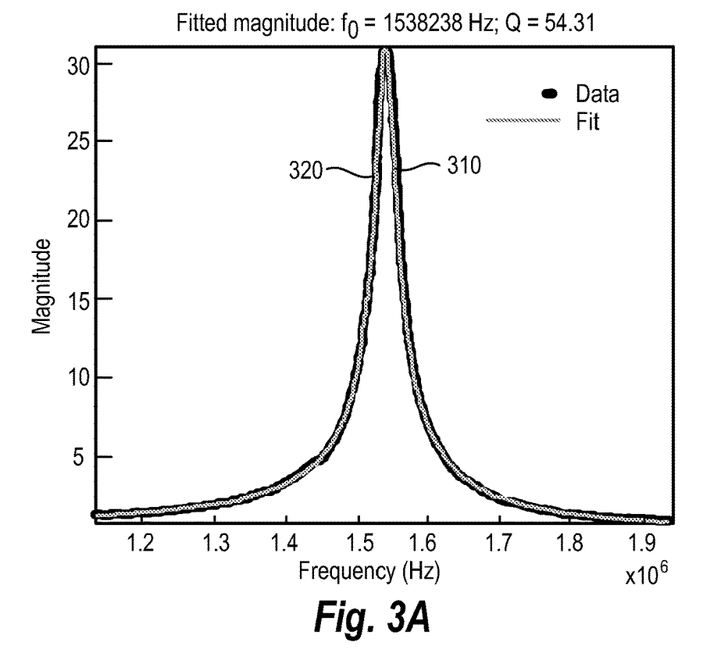
FIG. 3A is a graph depicting magnitude plotted with respect to frequency of a cantilever in the FM-AFM system, for comparison purposes.
Figure 3B:
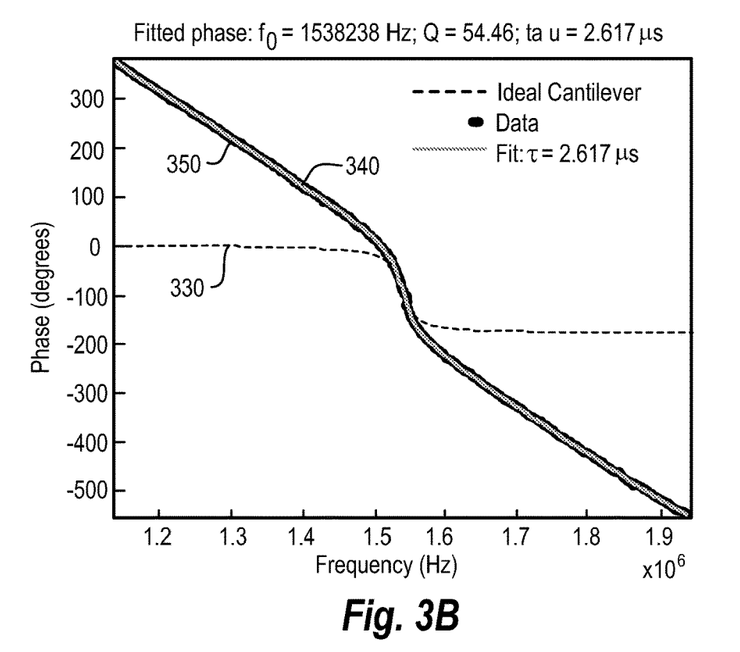
FIG. 3B is a graph depicting phase plotted with respect to frequency of a cantilever in the FM-AFM system, for comparison purposes.

FIG. 3A is a graph depicting the magnitude plotted with respect to frequency of the cantilever 102 in the FM-AFM system when excited electrostatically, where trace 310 shows the measured data and trace 320 shows the fit of the measured data with the cantilever model. Both trace 310 and 320 show that the resonant frequency $f_0$ (or $\omega_0$) of the cantilever 102 is about 1.54 MHz and that the corresponding quality factor is about 54.31. FIG. 3B is a graph depicting phase plotted with respect to frequency of the cantilever 102, where trace 330 shows the ideal phase at various frequencies, trace 340 shows the measured data, and trace 350 shows the fit of the measured data with the cantilever plus latency model. Ideally, the phase is about −90 degrees at the resonant frequency $f_0$. Fitting the measured data to the cantilever plus latency model indicates a spurious phase at various frequencies indicated by the departure of traces 340 and 350 from the ideal phase indicated by trace 330.

Next, the cantilever 102 was operated in FM mode in response to a drive signal provided by the PLL 220 and the AGC 230. With the PLL 220 and the AGC 230 engaged, the frequency of the amplitude adjusted (scaled), sine drive signal was measured as a function of a phase setpoint. Because the time constant of the cantilever 102 is $\tau_c=2Q/\omega_0=11.2$ μs, the 2.6 μs latency caused a phase error of approximately 20 percent at low frequency. In liquid, where high damping reduces the time constant $\tau_c$ of the cantilever 102 to below 2 μs, this error would be over 100 percent.

Figure 4:
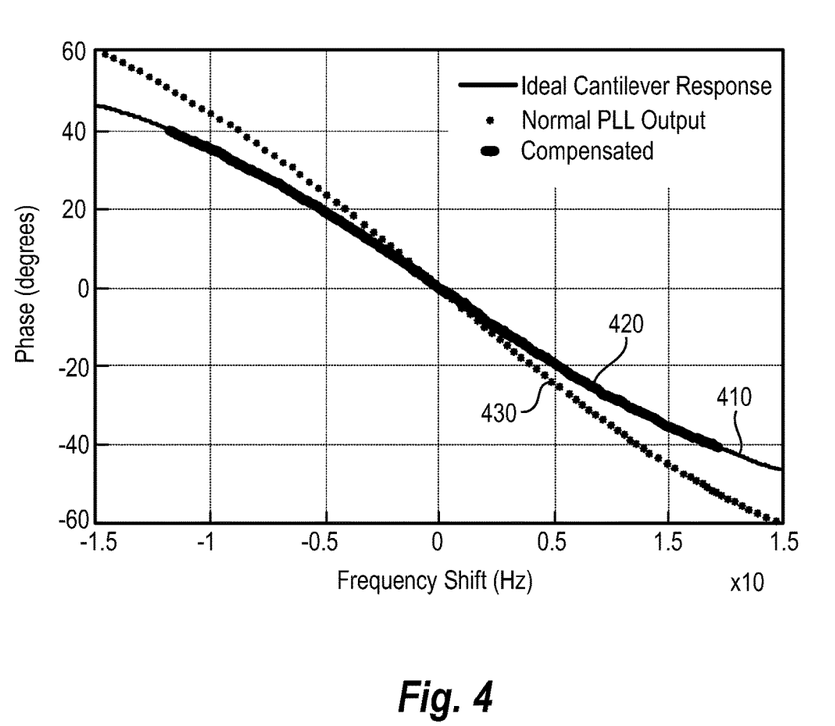
FIG. 4 is a graph depicting performance of a PLL with and without delay compensation, where the phase of the cantilever frequency response is plotted as a function of frequency shift of the cantilever frequency response, for comparison purposes.

FIG. 4 is a graph depicting performance of a PLL with and without delay compensation, where the phase of the cantilever deflection with respect to the excitation signal (cantilever frequency response) is plotted as a function of frequency shift of the excitation signal. Referring to FIG. 4, trace 410 depicts the ideal cantilever phase, trace 420 depicts the cantilever phase resulting from the 2.6 µs latency, discussed above, and trace 430 depicts the normal (uncompensated) PLL output for purposes of comparison.

The latency response 213 shown in FIG. 2 may be compensated for in accordance with two representative embodiments discussed below with reference to FIGS. 5-8, respectively. By compensating for the latency response 213, the cantilever 102 may be continually driven on-resonance, thus removing instrumental artifacts from the frequency shift and dissipation data.

Figure 5:
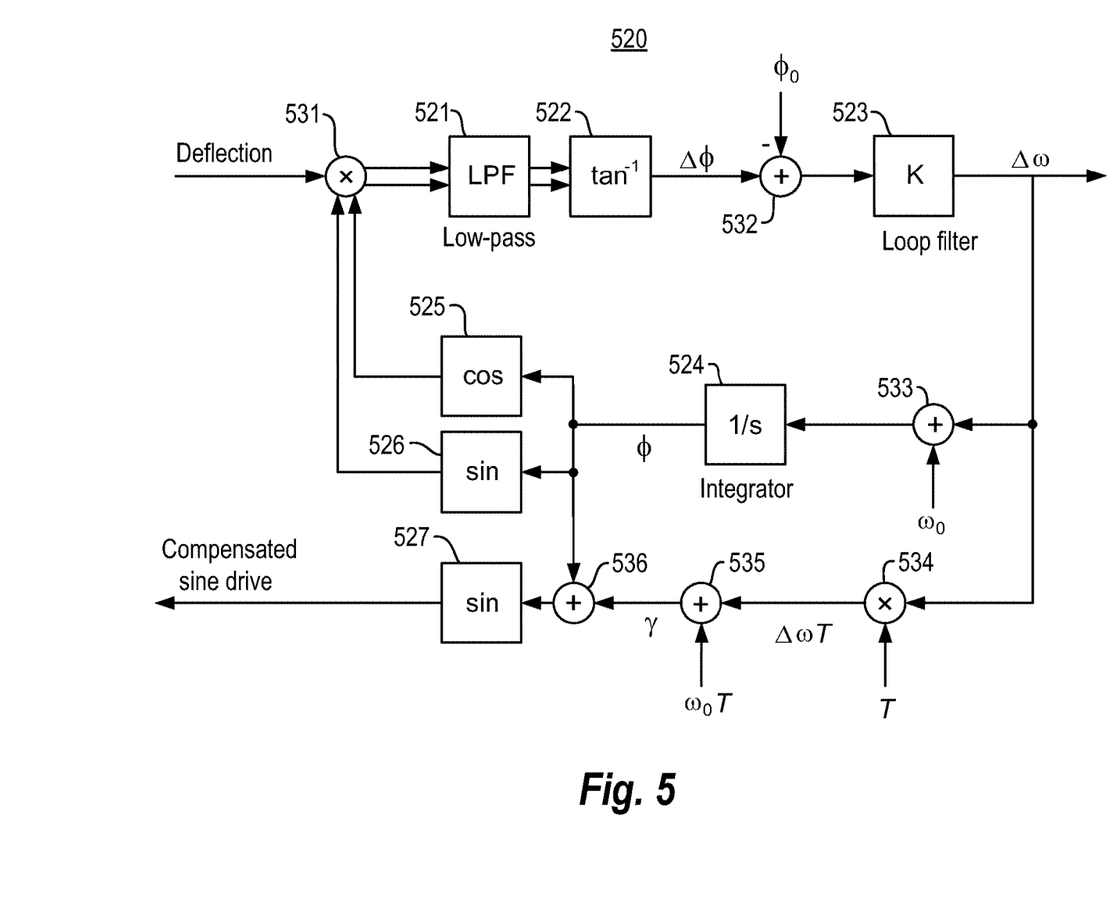
FIG. 5 is a simplified block diagram of a modified PLL of the controller in an FM-AFM system, in accordance with a first representative embodiment.

FIG. 5 is a simplified block diagram of a modified PLL 520 of the controller in an FM-AFM system, in accordance with a first representative embodiment.

Referring to FIG. 5, the modified PLL 520 includes low pass filter (LPF) 521, inverse tangent operator 522, loop filter 523, integrator 524, cosine operator 525 and sine operator 526, all of which may be included in a conventional PLL. In addition, the modified PLL 520 includes compensation sine operator 527, which outputs a compensated sine drive signal for driving the excitation system in a feed forward operation, e.g., to compensate for the anticipated spurious response 211 of the excitation system. That is, the modified PLL 520 employs a frequency-dependent feed forward correction to the conventional PLL output phase.

More particularly, the cosine operator 525 provides a reference cosine signal and the sine operator 526 provides a reference sine signal (which may be referred to as "first sine signal") at the output of the modified PLL 520. In a conventional FM-AFM, the sine signal provided by the sine operator 526 would be amplitude adjusted to provide the excitation signal for driving the excitation system, although this is not the case in the embodiment depicted in FIG. 5, as discussed below. Each of the cosine and sine reference signals from the cosine operator 525 and the sine operator 526, respectively, are mixed with the deflection signal (e.g., provided by deflection detector 107) by multiplier 531. The resulting cosine and sine products output by the multiplier 531 are low pass filtered by the LPF 521. The inverse tangent operator 522 performs an inverse tangent operation by dividing the low pass filtered cosine product by the low pass filtered sine product to provide a phase difference $\Delta\phi$. A phase setpoint $\phi_0$ is subtracted from the phase difference $\Delta\phi$ by the adder 532, the result of which passes through the loop filter 523 to provide measured frequency shift $\Delta\omega$ of the frequency response of the cantilever 102 (e.g., the cantilever response 212). The frequency shift $\Delta\omega$ is added to the resonant frequency $\omega_0$ of the cantilever 102 by adder 533 and input to the integrator 524, which provides the phase $\phi$ of the cantilever response 212. The phase $\phi$ is input to each of the cosine operator 525 and the sine operator 526 to continue the loop.

In addition, in order to compensate for the latency T, the frequency shift $\Delta\omega$ is also mixed with the latency T by multiplier 534 to provide the product $\Delta\omega T$. The product $\Delta\omega T$ is added to the product of the resonant frequency $\omega_0$ and the latency T by adder 535 to provide the relationship $(\omega_0+\Delta\omega)T$, which indicates the spurious phase $\gamma$ of the spurious response 211. The spurious phase $\gamma$ is added to the phase $\phi$ output by the integrator 524 by adder 536, and input to the compensation sine operator 527, which performs a sine operation and outputs a compensated sine drive signal (which may be referred to as "second sine signal") for driving the excitation system. The compensated sine drive signal thus can be calculated in real time.

In other words, instead of driving the excitation system with the reference sine signal output by the sine operator 526 used for phase detection in the modified PLL 520, as in the case of conventional FM-AFM systems, the excitation system in the depicted embodiment is driven by the compensated sine drive signal, output by the compensation sine operator 527, the phase of which is preemptively advanced by the spurious phase $\gamma$. The modified PLL 520 then tracks only phase changes arising from shifts of the cantilever frequency. The feed forward correction discussed above introduces no instability and the delay compensation functions over the full detection bandwidth.

Referring again to FIG. 4, trace 430 shows the results of compensation using the modified PLL 520 and the value of latency T determined from the fit of FIGS. 3A and 3B, as discussed above. As shown, the output of the modified PLL 520 substantially matches the ideal cantilever frequency response indicated by trace 410.

Figure 6:
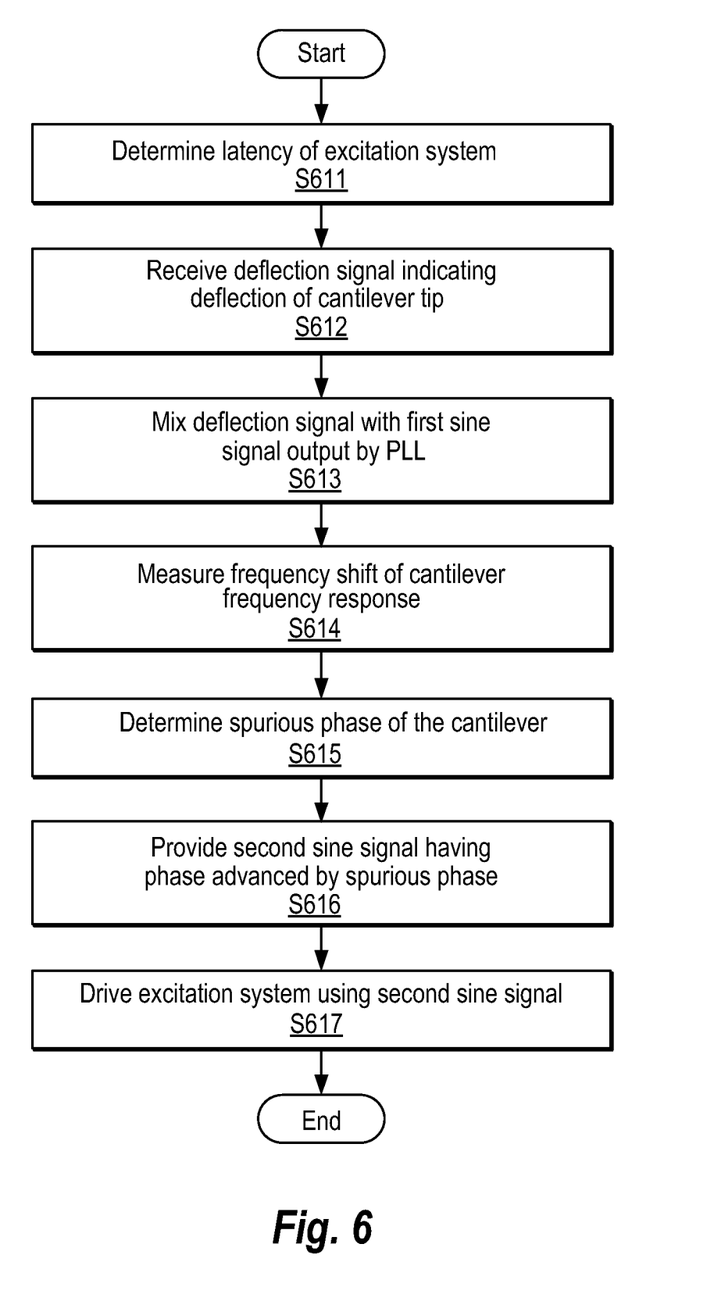
FIG. 6 is a flow diagram showing a method of compensating for spurious response using the modified PLL of FIG. 5, in accordance with a first representative embodiment.

FIG. 6 is a flow diagram showing the method of controlling an FM-AFM using the modified PLL 520, in accordance with a first representative embodiment.

Referring to FIGS. 1, 5 and 6, an FM-AFM includes a cantilever 102 having a resonant frequency and an excitation system configured to oscillate the cantilever 102 in response to a drive signal, as discussed above. Initially, the latency T of the excitation system is determined in operation S611. For example, the latency may be determined by measuring the frequency response of the cantilever 102 when it not in contact with the sample surface, and then fitting the measured frequency response with a mathematical model of the cantilever and additional time delay, as discussed above with reference to FIGS. 3A and 3B.

In operation S612, a deflection signal is received by the modified PLL 520 indicating a deflection of a tip probe 103 of the cantilever 102. The deflection signal is mixed with a first sine signal (e.g., reference sine signal) output by the modified PLL 520 in operation S613, along with a cosine signal (e.g., reference cosine signal) also output by the modified PLL 520. The frequency shift $\Delta\omega$ of the frequency response of the cantilever 102 is then measured in response to the drive signal in operation S614.

In operation S615, the spurious phase $\gamma$ of the cantilever 102 is determined. Generally, the spurious phase $\gamma$ is the difference in phase between an actual phase $\phi$ of the frequency response of the cantilever 102 and a desired phase of about −90 degrees. Determination of the spurious phase $\gamma$ is based on (i) the latency T of the excitation system determined in operation S611, (ii) the resonant frequency $\omega_0$ of the cantilever 102, and (iii) the frequency shift $\Delta\omega$ of the frequency response of the cantilever 102 measured in operation S614 in response to the drive signal. For example, the spurious phase $\gamma$ may be equal to $(\omega_0+\Delta\omega)T$, as discussed above. Notably, the spurious phase $\gamma$ may be calculated in real time. A second sine signal (e.g., compensated sine drive signal) is generated in operation S616 having a phase that is advanced by the determined spurious phase $\gamma$ to preemptively compensate for subsequent spurious phase $\gamma$ of the cantilever 102. The excitation system is then driven using the second sine signal as the drive signal in operation S617. The PLL 520 thus tracks only phase changes arising from shifts of the frequency response of the cantilever 102. Notably, the spurious response of the excitation system driven by the second sine signal may be determined and equalized, as discussed below with reference to FIGS. 10 and 11.

Figure 7:
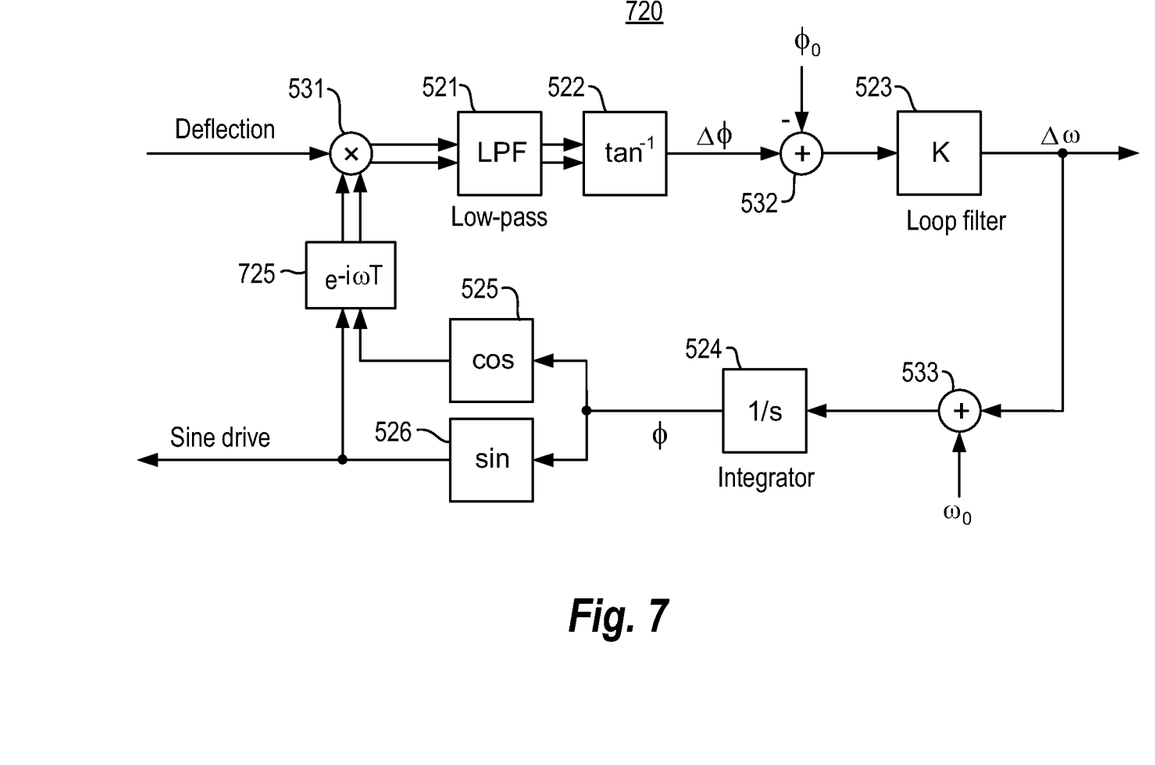
FIG. 7 is a simplified block diagram of a modified PLL of the controller in an FM-AFM system, in accordance with a second representative embodiment.

FIG. 7 is a simplified block diagram of a modified PLL 720 of the controller in an FM-AFM system, in accordance with a second representative embodiment.

Referring to FIG. 7, the modified PLL 720 includes LPF 521, inverse tangent operator 522, loop filter 523, integrator 524, cosine operator 525 and sine operator 526, all of which may be included in a conventional PLL. These elements function substantially the same as discussed above with reference to FIG. 5. In addition, the modified PLL 720 includes delay function 725, which delays the cosine signal provided by the cosine operator 525 and the sine signal provided by the sine operator 526 before they are mixed with the deflection signal by the multiplier 531. The delay function 725 implements a delay time corresponding to the latency response 213 of the excitation system shown in FIG. 2, thus employing a feed forward correction to the conventional PLL output phase. Meanwhile, the sine signal provided by the sine operator 526 is also output by the modified PLL 620 as the sine drive signal for driving the excitation system. In various embodiments, the delay time may be implemented digitally using a first-in-first out (FIFO) latch or a fractional delay filter, for example.

More particularly, the cosine operator 525 provides a reference cosine signal and the sine operator 526 provides a reference sine signal (which may be referred to as "first sine signal"). The reference sine signal provided by the sine operator 526 is also output as the sine drive signal for driving the excitation system. The delay function 725 receives and delays the reference cosine signal and the reference sine signal, and thus outputs a delayed cosine signal and a delayed sine signal (which may be referred to as "second sine signal"). The delayed cosine signal and the delayed sine signal are mixed with the deflection signal by the multiplier 531 for determining the frequency shift Δω of the frequency response of the cantilever 102, as discussed above. In this manner, the delayed cantilever signal is compared to a delayed reference (output by the delay function 725), nulling the effects of the latency T. Again, the feed forward correction introduces no instability and the delay compensation functions over the full detection bandwidth.

Figure 8:
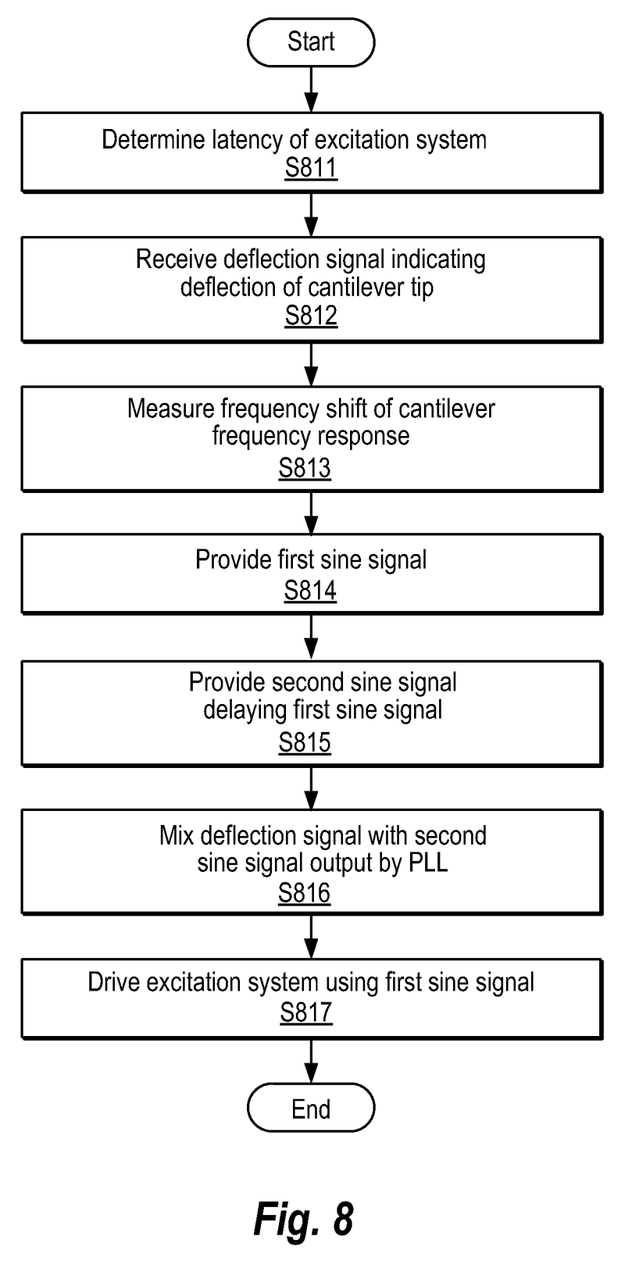
FIG. 8 is a flow diagram showing a method of compensating for spurious response using the modified PLL of FIG. 7, in accordance with a second representative embodiment.

FIG. 8 is a flow diagram showing the method of controlling an FM-AFM using the modified PLL 720, in accordance with a second representative embodiment.

Referring to FIGS. 1, 7 and 8, an FM-AFM includes a cantilever 102 having a resonant frequency and an excitation system configured to oscillate the cantilever 102 in response to a drive signal, as discussed above. Initially, the latency T of the excitation system is determined in operation S811. For example, the latency may be determined by measuring the frequency response of the cantilever 102 when it not in contact with the sample surface, and then fitting the measured frequency response with a mathematical model of the cantilever and additional time delay, as discussed above with reference to FIGS. 3A and 3B.

In operation S812, a deflection signal is received by the modified PLL 720 indicating a deflection of a probe tip 103 of the cantilever 102. The frequency shift Δω of the frequency response of the cantilever 102 is measured in response to the drive signal in operation S813. A first sine signal (e.g., reference sine signal or sine drive signal) is provided in operation S814 based on the frequency response and the resonant frequency of the cantilever 102. A second sine signal (e.g., delayed sine signal) is provided in operation S815 by delaying the first sine signal by a delay time, implemented by the delay function 725, which matches the determined latency T of the excitation system. Similarly, a first cosine signal (e.g., reference cosine signal) is also provided based on the frequency response and the resonant frequency of the cantilever 102, and a second cosine signal (e.g., delayed cosine signal) is provided by delaying the first cosine signal by the delay time.

The deflection signal is mixed with the second sine signal output by the modified PLL 720 in operation S816, along with the second cosine signal also output by the modified PLL 720. Meanwhile, the excitation system is driven using the first sine signal as the drive signal in operation S817. The modified PLL 720 thus tracks only phase changes arising from shifts of the frequency response of the cantilever 102. Notably, the spurious response of the excitation system driven by the second sine signal may be determined and equalized, as discussed below with reference to FIGS. 10 and 11.

Figure 9:
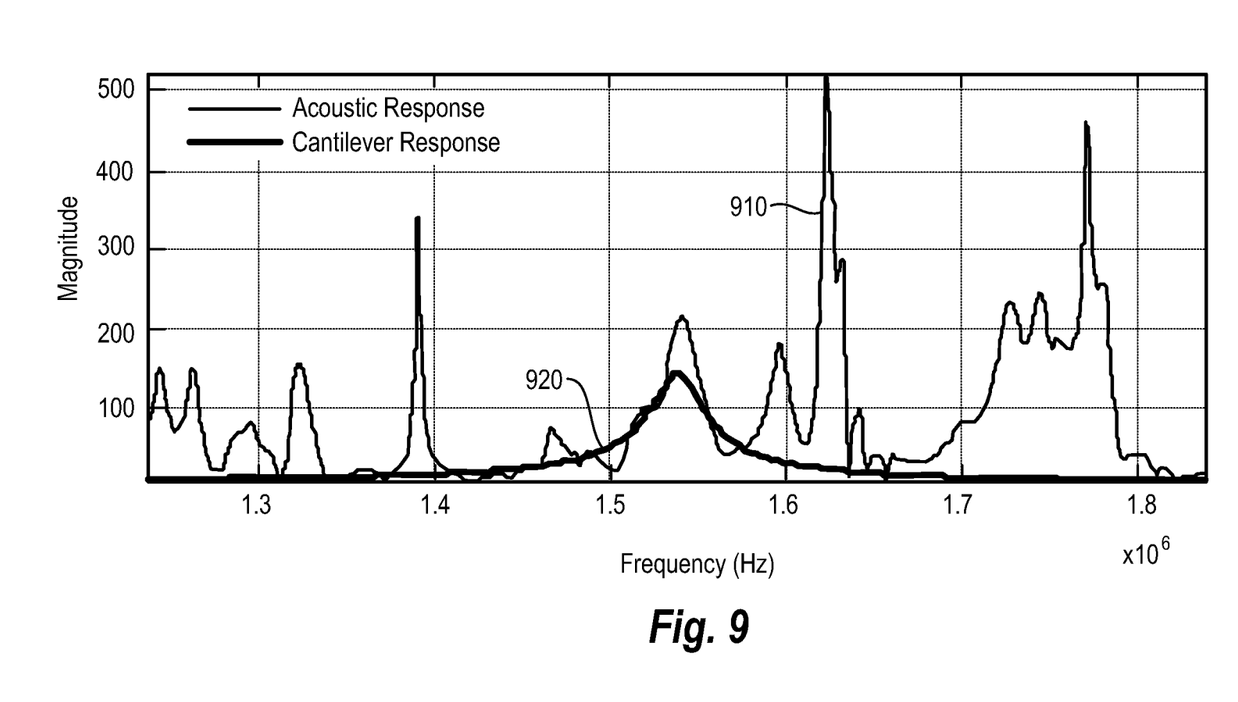
FIG. 9 is a graph depicting magnitude plotted with respect to frequency of a cantilever in the FM-AFM system, for comparison purposes.

In addition to delay compensation, as discussed above with regard to FIGS. 5-8, for example, the excitation system may be equalized. For example, with the cantilever 102 in the same position, the drive signal may be rerouted to a small piezoelectric actuator (e.g., excitation system 115) to drive the cantilever 102 acoustically. The resulting acoustic response is full of spurious peaks. For example, FIG. 9 is a graph depicting magnitude plotted with respect to frequency of a cantilever in the FM-AFM system, for comparison purposes. Trace 910 shows the acoustic response of the cantilever 102 when driven acoustically, and includes numerous spurious peaks. Trace 920 shows the true frequency response of the cantilever 102, where the peak corresponding to the resonant frequency is not even the dominant feature in the spectrum. Also, the maximum acoustic response in the neighborhood of the resonant frequency occurs about 3 kHz above resonance. If the user were to choose the maximum acoustic response as the resonant frequency (as is typically done), the cantilever 102 would be driven more than 15 degrees off-resonance.

Dividing the full response of the excitation system by the known frequency response of the cantilever 102 yields the spurious response (e.g., spurious response 211). Over the narrow frequency shift window used in FM-AFM (e.g., typically a few Hz to about 1 kHz at most), the spurious response 211 is effectively linear. Fitting a linear correction allows the spurious dynamics to be compensated. Once the spurious response 211 has been identified, it may be equalized.

Figure 10:
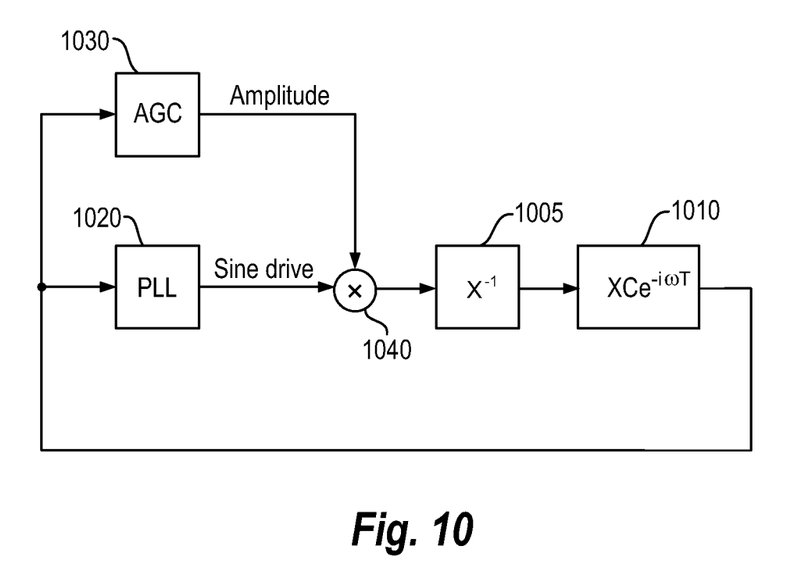
FIG. 10 is a simplified block diagram of control loop functionality of the controller in an FM-AFM system, for performing equalization of spurious response, in accordance with a first representative embodiment.
Figure 11:
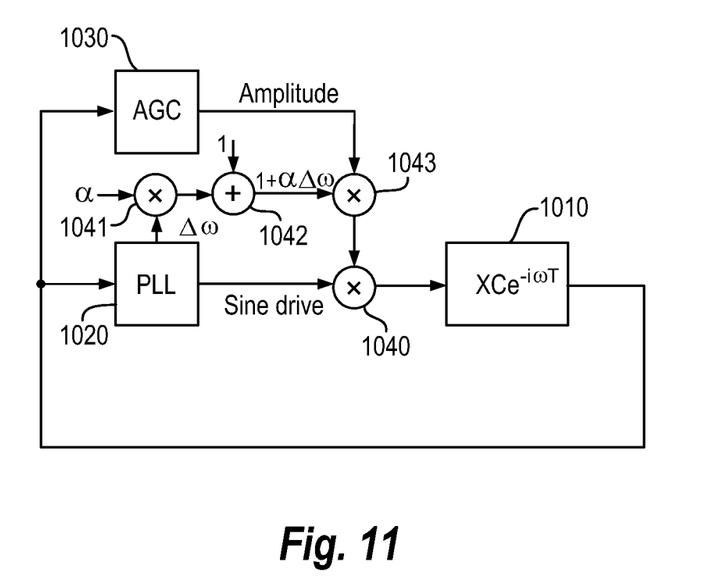
FIG. 11 is a simplified block diagram of control loop functionality of the controller in an FM-AFM system, for performing equalization of spurious response, in accordance with a second representative embodiment.

FIGS. 10 and 11 are simplified block diagrams of control loop functionality of a controller in an FM-AFM system, for performing equalization of spurious response, in accordance with first and second representative embodiments.

Referring to FIG. 10, the control loop includes collective system response 1010, which may include the spurious response (X) 211 of the excitation system, the cantilever response (C) 212 of the cantilever 102, and the latency response ($e^{-i\omega T}$) 213 of the excitation system, for example, discussed above with reference to FIG. 2. The control loop further includes modified PLL 1020 and AGC 1030. The modified PLL 1020 is delay compensated, and may be implemented as the modified PLL 520 discussed above with reference to FIGS. 5 and 6, or the modified PLL 720 discussed above with reference to FIGS. 7 and 8. The modified PLL 1020 provides a sine drive signal, which is mixed by multiplier 1040 with a gain control signal output by the AGC 1030 to provide an amplitude adjusted (or scaled) sine drive signal (which may be referred to as "excitation signal").

In the depicted embodiment, the control loop further includes a filter 1005 having a frequency response of $X^{-1}$ (i.e., the inversion of X, which is the spurious response 211). The filter 1005 is applied to the excitation signal, so that the deflection magnitude determined in the AGC 1030 will reflect only changes in damping of the cantilever 102. The delay compensation provided by the modified PLL 1020 is still able to remove pure time delays or non-minimum phase arising from right-hand-plane zeros. Accordingly, equalizing the determined spurious response may include filtering the excitation signal with an inverse of the determined spurious response.

Referring to FIG. 11, the control loop includes the collective system response 1010, the modified PLL 1020 and the AGC 1030, discussed above with reference to FIG. 10. In the depicted embodiment, the modified PLL 1020 outputs the frequency shift $\Delta\omega$ of the frequency response of the cantilever 102 (i.e., the frequency shift $\Delta\omega$ of the cantilever response 212) and the sine drive signal. The frequency shift $\Delta\omega$ is mixed by multiplier 1041 with a line coefficient $\alpha$ to provide the product $\alpha\Delta\omega$. One is added to the product $\alpha\Delta\omega$ by adder 1042 to provide a line with the line coefficient $\alpha$ (i.e., $1+\alpha\Delta\omega$) that can be fit to the absolute value of the frequency response of $X^{-1}$ (i.e., $|X^{-1}|$). The output of the adder 1042 is mixed by multiplier 1043 with a gain control signal output by the AGC 1030, which is mixed by multiplier 1040 with the sine drive signal output by the modified PLL 1020 to provide an amplitude adjusted (or scaled) sine drive signal (which may be referred to as "excitation signal"). Accordingly, the amplitude of the sine drive signal is multiplied by $(1+\alpha\Delta\omega)$ to provide a first-order correction to the amplitude adjusted sine drive signal. The phase dispersion $\angle X^{-1}$ may be lumped into the latency to be similarly corrected in the modified PLL 1020 in both FIGS. 10 and 11.

Accordingly, equalizing the determined spurious response may include fitting a line having a line coefficient to the absolute value of the inversion of determined spurious response, and adjusting an amplitude of the sine drive signal based on the line coefficient and the frequency shift of the frequency response of the cantilever in response to the sine drive signal. Adjusting the amplitude of the sine drive signal may include multiplying the amplitude of the sine drive signal by the sum of one and the product of the line coefficient and the frequency shift of the frequency response of the cantilever in response to the sine drive signal.

Figure 12A:
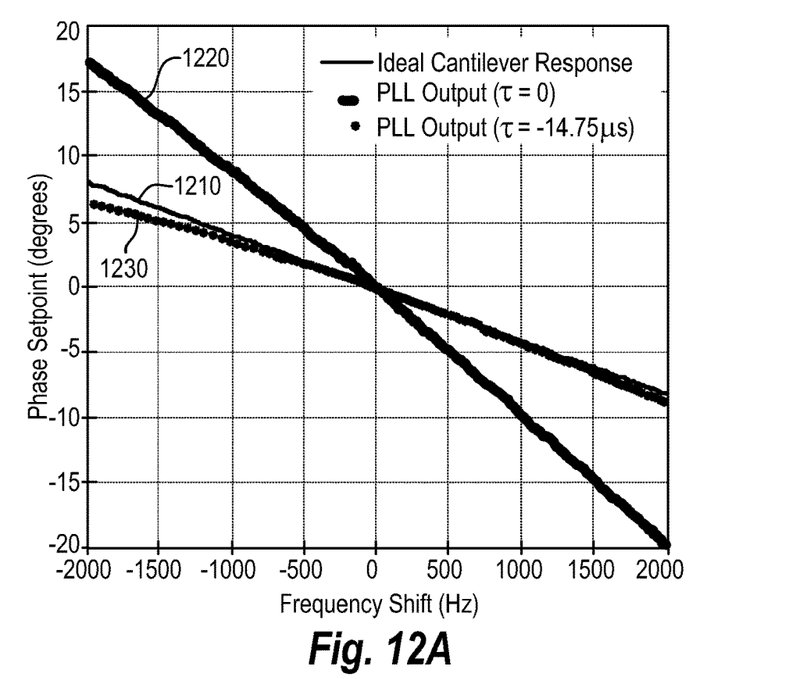
FIG. 12A is a graph depicting phase setpoint plotted with respect to frequency shift of a cantilever in the FM-AFM system, for comparison purposes.
Figure 12B:
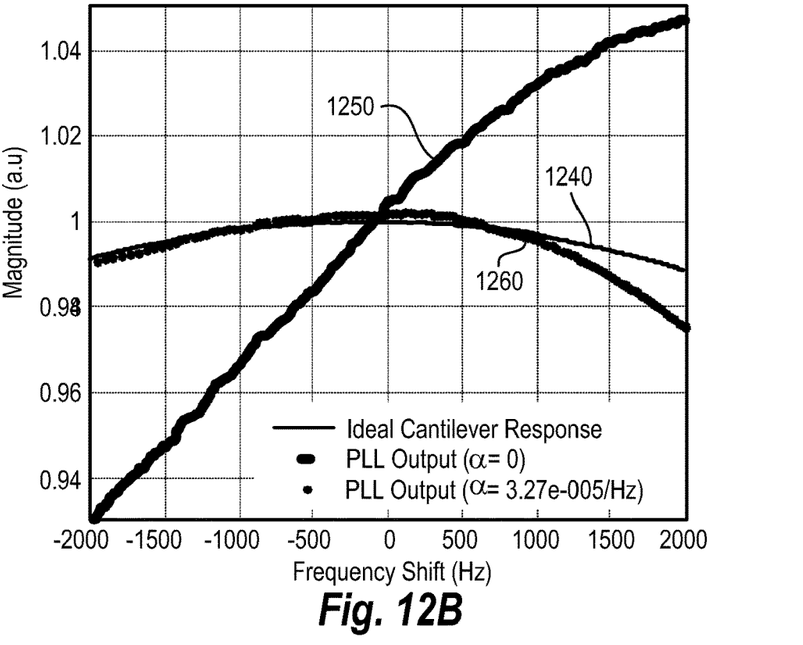
FIG. 12B is a graph depicting magnitude plotted with respect to frequency shift of a cantilever in the FM-AFM system, for comparison purposes.

FIG. 12A is a graph depicting phase setpoint plotted with respect to frequency shift of a cantilever in the FM-AFM system of FIG. 11, where trace 1210 shows the ideal cantilever response, trace 1220 shows the cantilever response when the output of the modified PLL has a delay of zero (T=0), and trace 1230 shows the cantilever response when the output of the modified PLL has a delay of 14.75 µs (T=14.75 µs). FIG. 12B is a graph depicting magnitude plotted with respect to frequency shift of a cantilever in the FM-AFM system of FIG. 11, where trace 1240 shows the ideal cantilever response, trace 1250 shows the cantilever response when the line coefficient has a value of zero ($\alpha$=0), and trace 1260 shows the cantilever response when the line coefficient has a value of $3.27 \times 10^{-5}$ Hz ($\alpha$=$3.27 \times 10^{-5}$ kHz). As shown in FIGS. 12A and 12B, in both phase and magnitude, the RMS error is reduced by a about factor of 10. Notably, this is effectively a "worst-case" result; narrower frequency ranges become more accurate. Notably, as compared to FIG. 9, the corrected maximum magnitude occurs at the cantilever resonant frequency rather than 3 kHz above it.

Referring again to FIG. 1, the controller 110 may be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of the controller 110 are provided below in connection with the representative embodiments. In an embodiment, the controller 110 is implemented on a real-time operating system (OS) used in the FM-AFM system 100 or as a standalone device. When using a processor or CPU, a memory (not shown) is included for storing executable software/firmware and/or executable code that controls the signal from the controller 110 to the actuator 105. The memory may be any number, type and combination of nonvolatile memory, such as read only memory (ROM), and volatile memory, such as random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), flash memory, a CD, a DVD, a universal serial bus (USB) drive, and the like.

For example, the controller 110 may include an FPGA onto which very high speed integrated circuit hardware description language (VHDL) code has been compiled and uploaded. The deflection signal 108 from the deflection detector 107 is digitized by ADC 109. Based on the deflection signal, the FPGA creates output signal 112 that emerges from the DAC 113, is amplified, and then provided to the actuator 105. The controller 110 illustratively includes a proportional-integral-differential (PID) filter block and a series of digital biquadratic filters, known to one of ordinary skill in the art. The PID filters and the digital biquadratic filters of the controller 110 have coefficients useful in establishing the filter characteristics. The coefficients can be dynamically reconfigured to change the filter characteristics, such as by a remote computer (e.g. a computer hosting a graphical user interface for the FM-AFM system 100 and communicating via a communication protocol, such as ethernet). The frequency response of the controller 110 is a function of the filter coefficients, and methods for calculating theoretical frequency responses for digital filters are well-known. Illustratively, the frequency responses of the controller 110 can be calculated using known programming software (e.g., MatLab). For example, a notch filter for use in mitigating off-surface resonances of the cantilever 102, as described by International Application PCT/US11/26191 to C. Moon, can be specified by a center frequency, a depth, and a width (quality (Q) or damping factor). Known programming software tools (e.g., Matlab) or analytical expressions can be used to convert the desired parameters of the notch filter into biquadratic filter coefficients for the biquadratic filters of the controller 110.

Notably, the various embodiments are not limited to FM-AFM implementations. Automatically controlling gain may be used in any system that is limited by phase and not by gain associated with resonances.

In view of this disclosure it is noted that the various apparatuses and methods for controlling an AFM can be implemented in variant structures, using variant components and variant methods in keeping with the present teachings. Further, the various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A method executed by a controller for controlling a frequency modulation (FM) atomic force microscope (AFM) comprising a cantilever having a resonant frequency and an excitation system configured to oscillate the cantilever in response to a drive signal, the method comprising:
   initially determining latency of the excitation system;
   receiving a deflection signal indicating a deflection of a tip of the cantilever;
   mixing the deflection signal with a first sine signal generated and output by a phase lock loop (PLL), based on a frequency response and the resonant frequency of the cantilever, to provide a mixed input signal input to the PLL;
   measuring a frequency shift of a frequency response of the cantilever in response to the drive signal;
   determining spurious phase of the cantilever based on the determined latency, the resonant frequency of the cantilever, and the measured frequency shift of the frequency response of the cantilever in response to the drive signal;
   generating and outputting a second sine signal from the PLL as a sine drive signal having a phase that is advanced by the determined spurious phase to preemptively compensate for subsequent spurious phase of the cantilever; and
   driving the excitation system using the sine drive signal with an adjusted amplitude as the drive signal.

2. The method of claim 1, wherein the PLL tracks only phase changes arising from shifts of the frequency response of the cantilever.

3. The method of claim 1, wherein the spurious phase of the cantilever is a difference in phase between an actual phase of the cantilever and a desired phase of about −90 degrees.

4. The method of claim 1, further comprising:
   determining a spurious response of the excitation system driven by the amplitude adjusted second sine signal; and
   equalizing the determined spurious response.

5. The method of claim 4, wherein determining the spurious response of the excitation system comprises dividing a frequency response of the excitation system by the frequency response of the cantilever.

6. The method of claim 4, wherein equalizing the determined spurious response comprises filtering the amplitude adjusted second sine signal with an inverse of the determined spurious response.

7. The method of claim 4, wherein equalizing the determined spurious response comprises:
   fitting a line with a line coefficient to the absolute value of an inverse of the determined spurious response; and
   adjusting the amplitude of the second sine signal based on the line coefficient and the frequency shift of the frequency response of the cantilever.

8. The method of claim 7, wherein adjusting the amplitude of the second sine signal comprises multiplying the amplitude of the second sine signal by the sum of one and the product of the line coefficient and the frequency shift of the frequency response of the cantilever.

9. The method of claim 1, wherein determining the latency of the excitation system comprises:
   measuring the frequency response of the cantilever when not in contact with a sample surface; and
   fitting the measured frequency response with a mathematical model of the cantilever and additional time delay.

10. The method of claim 1, wherein the spurious phase of the cantilever is calculated in real time.

11. A method of controlling a frequency modulation (FM) atomic force microscope (AFM) comprising a cantilever having a resonant frequency and an excitation system configured to oscillate the cantilever in response to a drive signal, the method comprising:
    initially determining a latency response of the excitation system;
    receiving a deflection signal indicating a deflection of a tip of the cantilever;
    mixing the deflection signal with a second sine signal generated and output by a phase lock loop (PLL) to provide a mixed input signal input to the PLL;
    measuring a frequency shift of a frequency response of the cantilever in response to the mixed input signal;
    generating a first sine signal based on the frequency response and the resonant frequency of the cantilever, wherein the second sine signal is generated by delaying the first sine signal by a delay time that corresponds to the determined latency response of the excitation system;
    outputting the first sine signal from the PLL as a sine drive signal; and
    driving the excitation system using the sine drive signal with an adjusted amplitude as the drive signal.

12. The method of claim 11, further comprising:
    determining a spurious response of the excitation system driven by the drive signal; and
    equalizing the determined spurious response.

13. The method of claim 12, further comprising:
    determining the frequency response of the cantilever via a thermal tune, the thermal tune comprising fitting deflection noise density to a mathematical model of the cantilever.

14. The method of claim 12, wherein equalizing the determined spurious response comprises filtering the drive signal with an inverse of the determined spurious response.

15. The method of claim 12, wherein equalizing the determined spurious response comprises:
    fitting a line with a line coefficient to the absolute value of an inverse of the determined spurious response; and
    adjusting an amplitude of the first sine signal based on the line coefficient and the frequency shift of the frequency response of the cantilever.

16. The method of claim 15, wherein adjusting the amplitude of the first sine signal comprises multiplying the amplitude of the first sine signal by the sum of one and the product of the line coefficient and the frequency shift of the frequency response of the cantilever.

17. The method of claim 11, wherein delaying the first sine signal is implemented using one of a first-in-first out (FIFO) latch or a fractional delay filter.

* * * * *